(12) United States Patent
Listvan

(10) Patent No.: US 6,378,239 B1
(45) Date of Patent: Apr. 30, 2002

(54) FISHING POLE ANTENNA

(76) Inventor: Jerry L. Listvan, 7710-A Joella Rd., Eightmile, AL (US) 36613

( * ) Notice: Subject to any disclaimer, the term of this patent is extended or adjusted under 35 U.S.C. 154(b) by 0 days.

(21) Appl. No.: 09/692,868

(22) Filed: Oct. 23, 2000

(51) Int. Cl.⁷ .............................. A01K 87/00; H01Q 1/32
(52) U.S. Cl. ........................ 43/18.1; 343/711; D14/230
(58) Field of Search .................. 43/18.1; 343/711–718; D14/230, 232

(56) References Cited

U.S. PATENT DOCUMENTS

| | | | | |
|---|---|---|---|---|
| 2,578,887 A | * | 12/1951 | Jackson et al. ................. | 43/15 |
| 4,134,120 A | * | 1/1979 | DeLoach et al. ............ | 343/715 |
| 6,126,969 A | * | 10/2000 | Casto ........................... | 623/65 |

* cited by examiner

*Primary Examiner*—Charles T. Jordan
*Assistant Examiner*—Kimberly S. Smith
(74) *Attorney, Agent, or Firm*—Peter Loffler

(57) ABSTRACT

A fishing pole is made from a rod that is made from conductive material and has a reel and an eyelet attached thereto. Line from within the reel passes through the eyelet and is used for fishing in the usual way. An end of the rod is removably attached to a vehicle and is electrically connected to a receiver, such as a radio, disposed within the vehicle so that the rod servers as the vehicle's antenna. The rod is removable from the vehicle so that the rod can be used as a fishing pole.

10 Claims, 2 Drawing Sheets

FISHING POLE ANTENNA

BACKGROUND OF THE INVENTION

1. Field of the Invention

The present invention relates to an antenna that is removably attachable to a vehicle, the antenna also being usable as a fishing pole.

2. Background of the Prior Art

A true fisherman that finds himself in close proximity to a lake or a stream will instinctively want to fish the waters before him. However, if the meeting with the body of water is unexpected, the fisherman may find himself without a fishing pole.

Some individuals will attempt to be prepared by having a fishing pole constantly within the vehicle. However, the fishing pole may take up too much space for this arrangement to be practical, or the fishing pole will become damaged as heavy items are placed onto the pole. Other individuals will attempt to remember to pack a fishing pole whenever an opportune fishing moment may present itself. Unfortunately, even the most forward thinking and prepared individual will find such an arrangement spotty at best.

Therefore, there is a need in the art for a fishing pole that can remain about a vehicle on a generally permanent basis without taking away interior storage space and without the possibility of the fishing pole becoming damaged during transport of other items. Ideally, such as fishing pole will be of relatively simple design and construction and will be easy to retrieve and store.

SUMMARY OF THE INVENTION

The fishing pole antenna of the present invention addresses the aforementioned needs in the art. The present invention provides a device that allows an individual to have a fishing pole about a vehicle on a relatively permanent basis. Accordingly, the fishing pole will be readily available whenever a fishing moment presents itself. The fishing pole antenna does not require storage space within the vehicle and will not become damaged during transport of other items within the vehicle. The fishing pole antenna is of relatively simple design and construction and is relatively easy to retrieve and store.

The fishing pole antenna of the present invention is comprised of an antenna rod with a reel secured thereto. At least one eyelet is attached to the antenna rod. An end of the antenna rod is threaded. The antenna rod is made from a conductive material and the threaded end of the rod is threadably attached to the vehicle. The antenna rod is electrically connected to a receiver disposed within the vehicle and acts as the vehicle's antenna.

BRIEF DESCRIPTION OF THE DRAWINGS

Similar reference numerals refer to similar parts throughout the several views of the drawings.

DESCRIPTION OF THE PREFERRED EMBODIMENT

Figure 1:
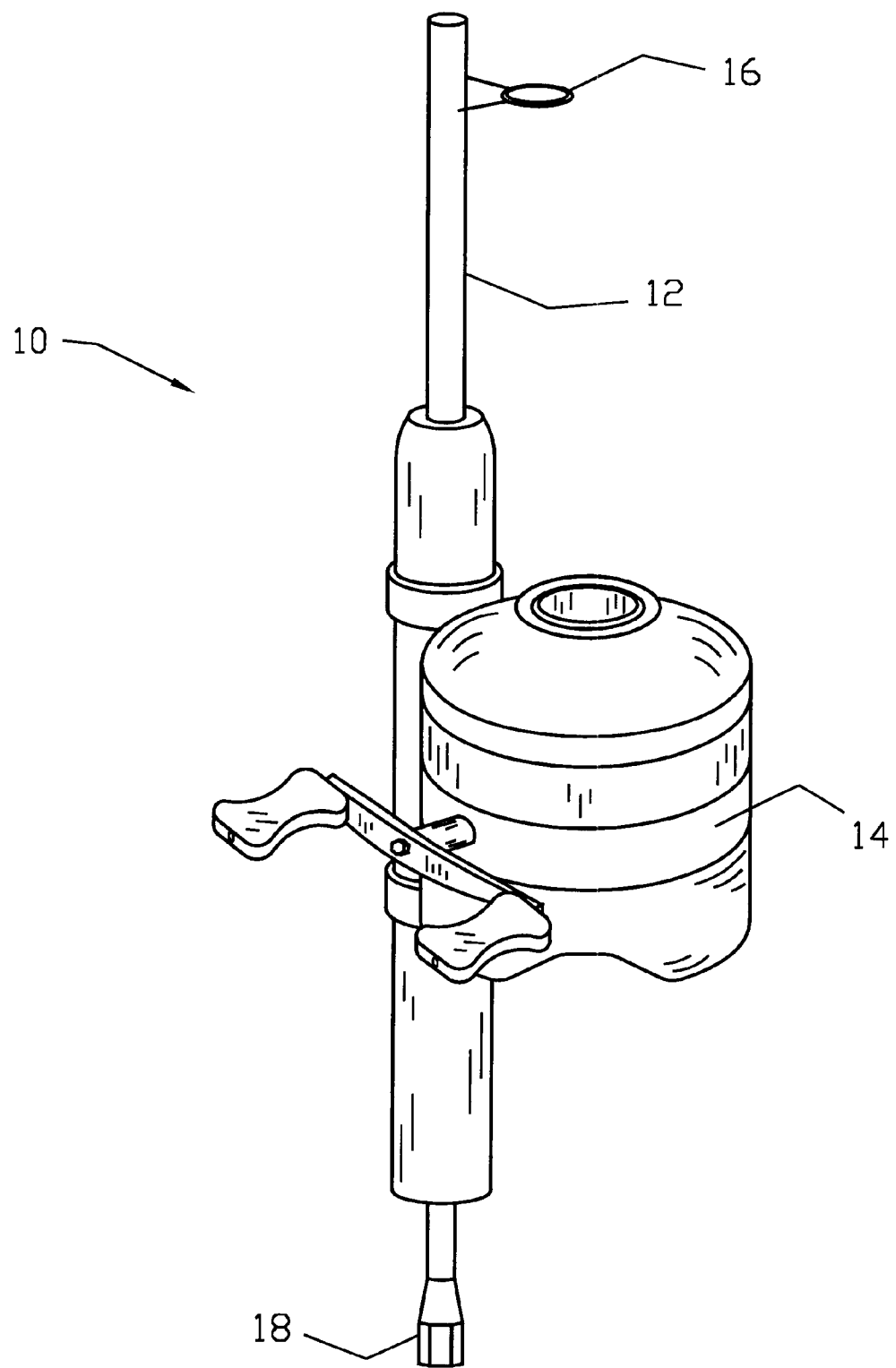
FIG. 1 is a perspective view of the fishing pole antenna of the present invention.
Figure 2:
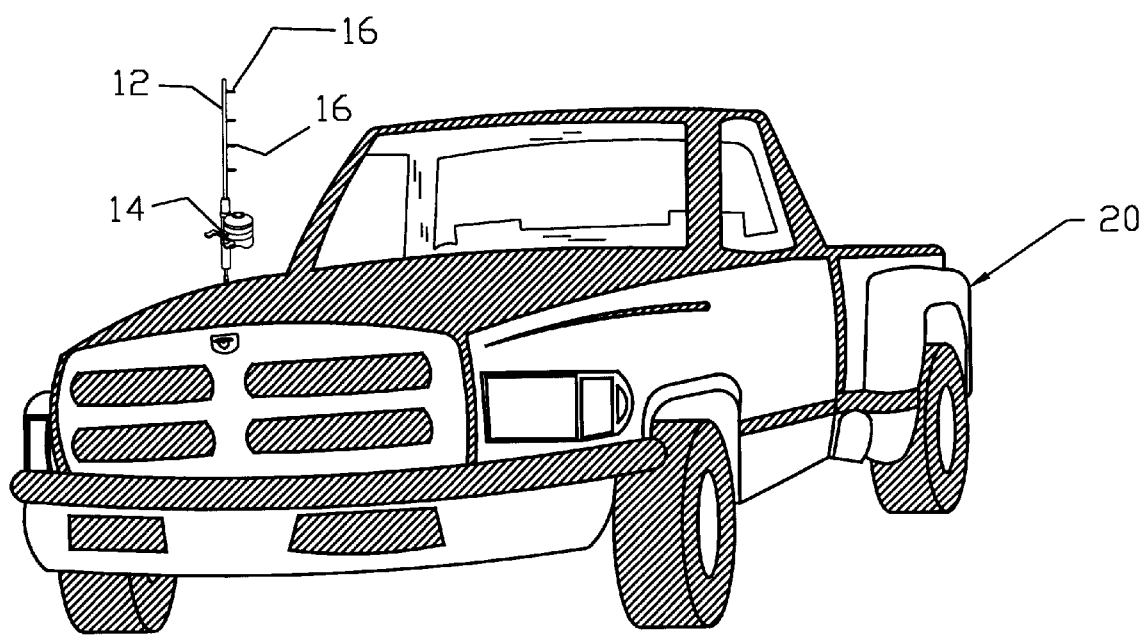
FIG. 2 is an environmental view of the fishing pole antenna attached to a vehicle.

Referring now to the drawings, it is seen that the fishing pole antenna of the present invention, generally denoted by reference numeral 10, is comprised of an antenna rod 12 with a reel 14 of any appropriate design, secured thereto. At least one eyelet 16 is attached to the antenna rod 12. An end 18 of the antenna rod is threaded. The antenna rod 12 is made from a conductive material and the threaded end 18 of the rod is threadably attached to the vehicle 20. It is expressly recognized that the rod 12 can be removably attached to the vehicle 20 is any other appropriate fashion in keeping within the scope and spirit of the present invention.

The antenna rod 12 is electrically connected to a receiver (not illustrated) disposed within the vehicle 20, such as a typical vehicle stereo, and serves as the receiver's antenna when the rod 12 is secured to the vehicle 20.

In operation, the fishing pole antenna 10 of the present invention is secured to the vehicle 20 and serve's as the vehicle's antenna in normal fashion. When desired, the rod 12 is removed from the vehicle 20 and is used for fishing in the usual way. Once the user has finished fishing, the rod 12 is reattached to the vehicle 20 so that the fishing pole antenna 10 can once again be used as an antenna for the radio within the vehicle 20.

The reel 14 and the eyelets 16 that are attached to the rod 12 not only serve to allow the rod 12 to be used as a fishing pole, but also serve to enhance the aesthetic appeal of the vehicle 20 to which the fishing pole antenna 10 is attached.

While the invention has been particularly shown and described with reference to an embodiment thereof, it will be appreciated by those skilled in the art that various changes in form and detail may be made without departing from the spirit and scope of the invention.

I claim:

1. A fishing pole comprising:

an antenna rod;

a reel secured to the antenna rod;

at least one eyelet attached to the antenna rod; and wherein a first end of the antenna rod is threaded.

2. The fishing pole as in claim 1 wherein the antenna rod is made from a conductive material.

3. The fishing pole as in claim 1 in combination with a vehicle wherein the first end of the antenna rod is threadably attached to the vehicle.

4. The fishing pole as in claim 3 wherein the antenna rod is electrically connected to a receiver disposed within the vehicle.

5. A fishing pole in combination with a vehicle, the fishing pole comprising:

an antenna rod removably securable to the vehicle;

a reel secured to the antenna rod; and at least one eyelet attached to the antenna rod.

6. The fishing pole as in claim 5 wherein the antenna rod is made from a conductive material.

7. The fishing pole as in claim 5 wherein the antenna rod is threadably securable to the vehicle.

8. A fishing pole comprising:

an antenna rod made from a conductive material;

a reel secured to the antenna rod;

at least one eyelet attached to the antenna rod; and wherein a first end of the antenna rod is threaded.

9. The fishing pole as in claim 8 in combination with a vehicle wherein the first end of the antenna rod is threadably attached to the vehicle.

10. The fishing pole as in claim 9 wherein the antenna rod is electrically connected to a receiver disposed within the vehicle.

* * * * *